United States Patent [19]

Trost

[11] 4,034,397
[45] July 5, 1977

[54] PILOT SIGNAL LUMINANCE CORRECTION MEANS FOR VIDEO RECORDING APPARATUS

[75] Inventor: Allen J. Trost, Cupertino, Calif.

[73] Assignee: Ampex Corporation, Redwood City, Calif.

[22] Filed: Mar. 19, 1976

[21] Appl. No.: 668,660

[52] U.S. Cl. .................................................. 358/8
[51] Int. Cl.² .................... H04N 5/78; H04N 5/795
[58] Field of Search .......................... 358/8; 360/26

[56] References Cited
UNITED STATES PATENTS 3,702,374  11/1972  Numakura ............................ 358/8

OTHER PUBLICATIONS

Proceedings of the Conference on Video & Data Recording, Birmingham, England, July 10–12, 1973, pp. 27–39.

*Primary Examiner*—Robert L. Richardson
*Attorney, Agent, or Firm*—Robert G. Clay; Ralph L. Mossino

[57] ABSTRACT

A system is disclosed for correcting luminance errors that are caused by velocity errors in the playback of a color video signal on video recording apparatus of the type which utilizes a pilot that is included in the color video signal at a frequency that is higher than the color subcarrier frequency and a carrier frequency which is frequency modulated by the pilot and color video signal. During playback, luminance correction signals are added to the demodulated color video signal to remove distortions in the luminance level of the color video signal.

16 Claims, 12 Drawing Figures

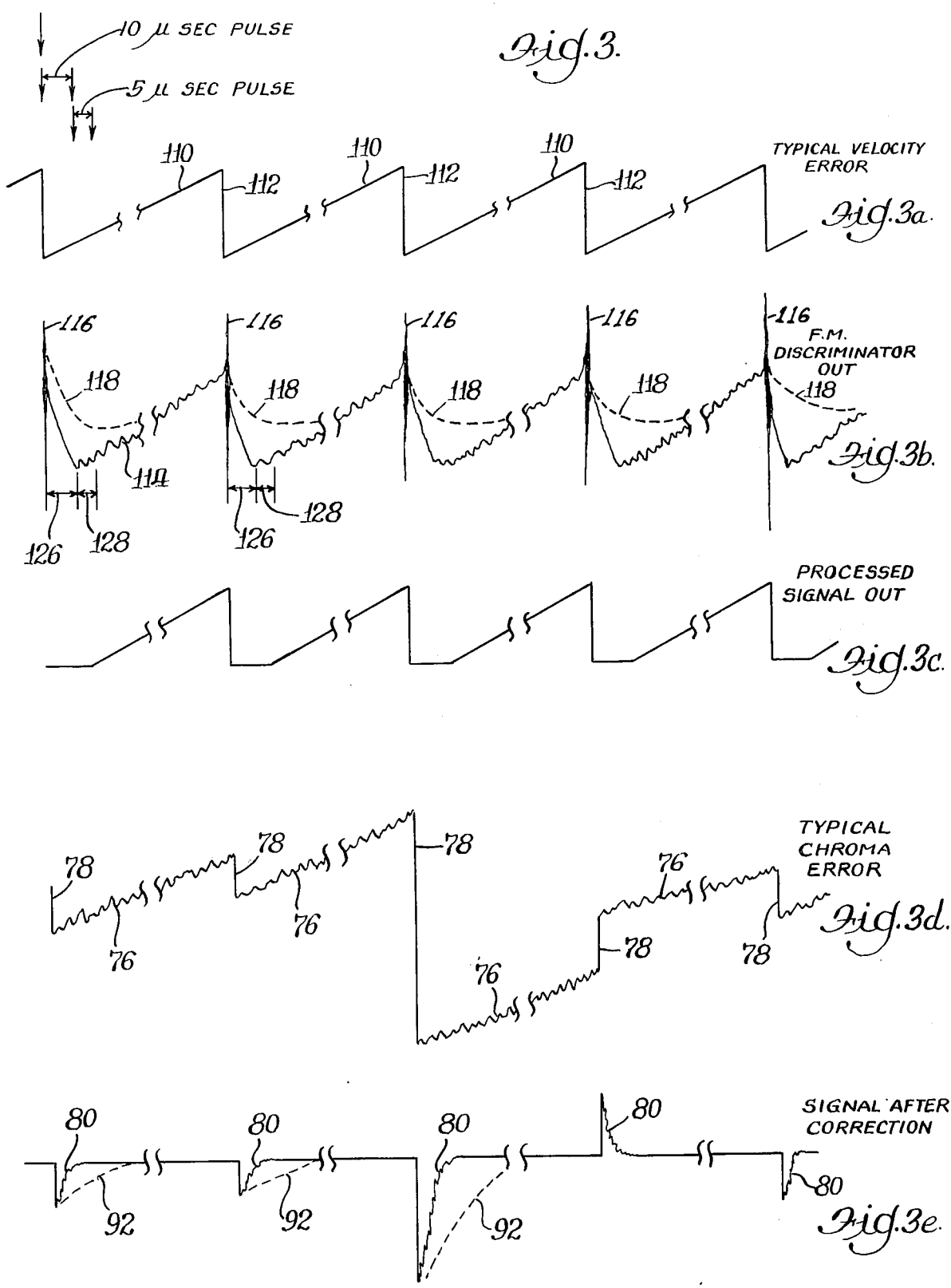

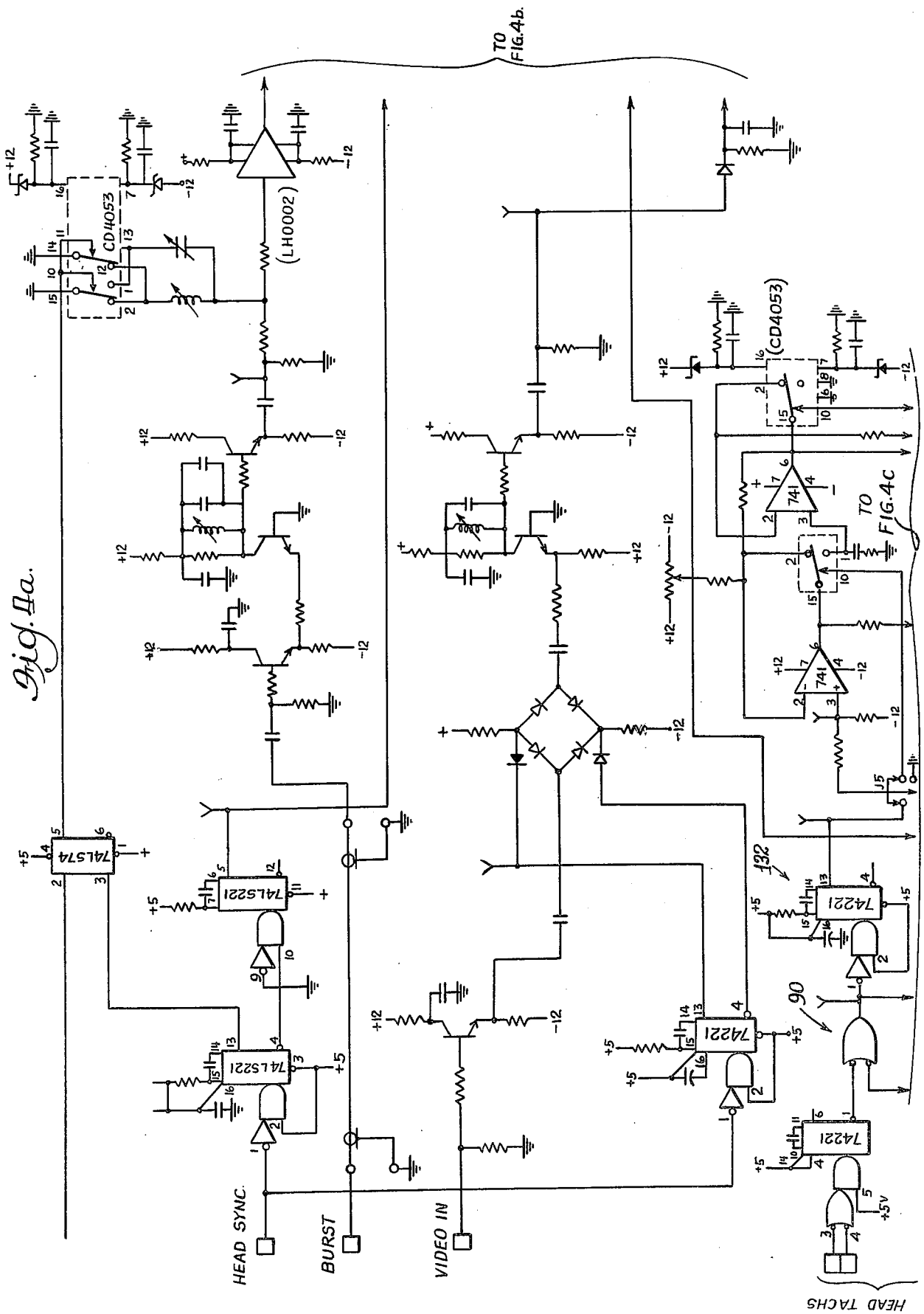

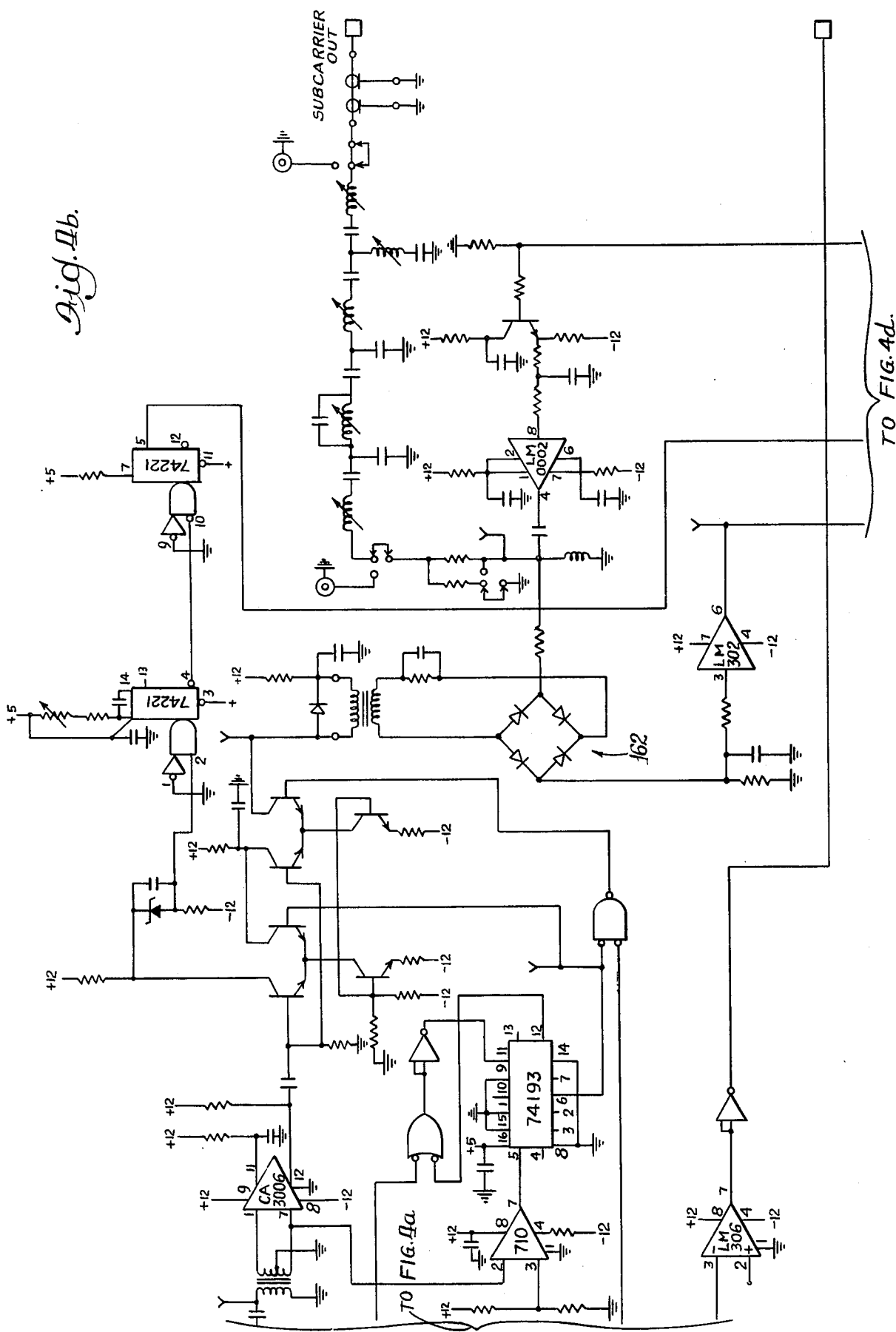

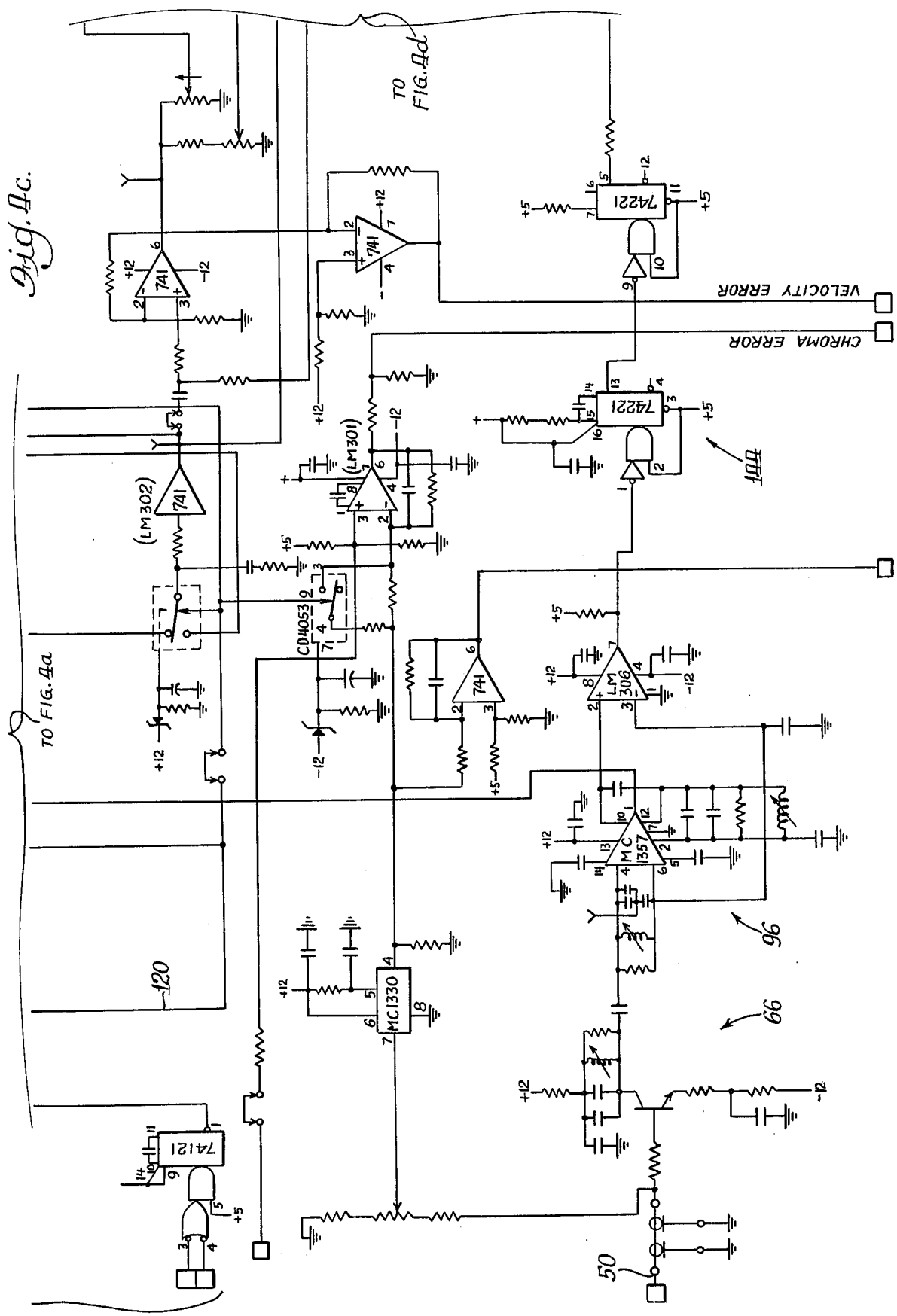

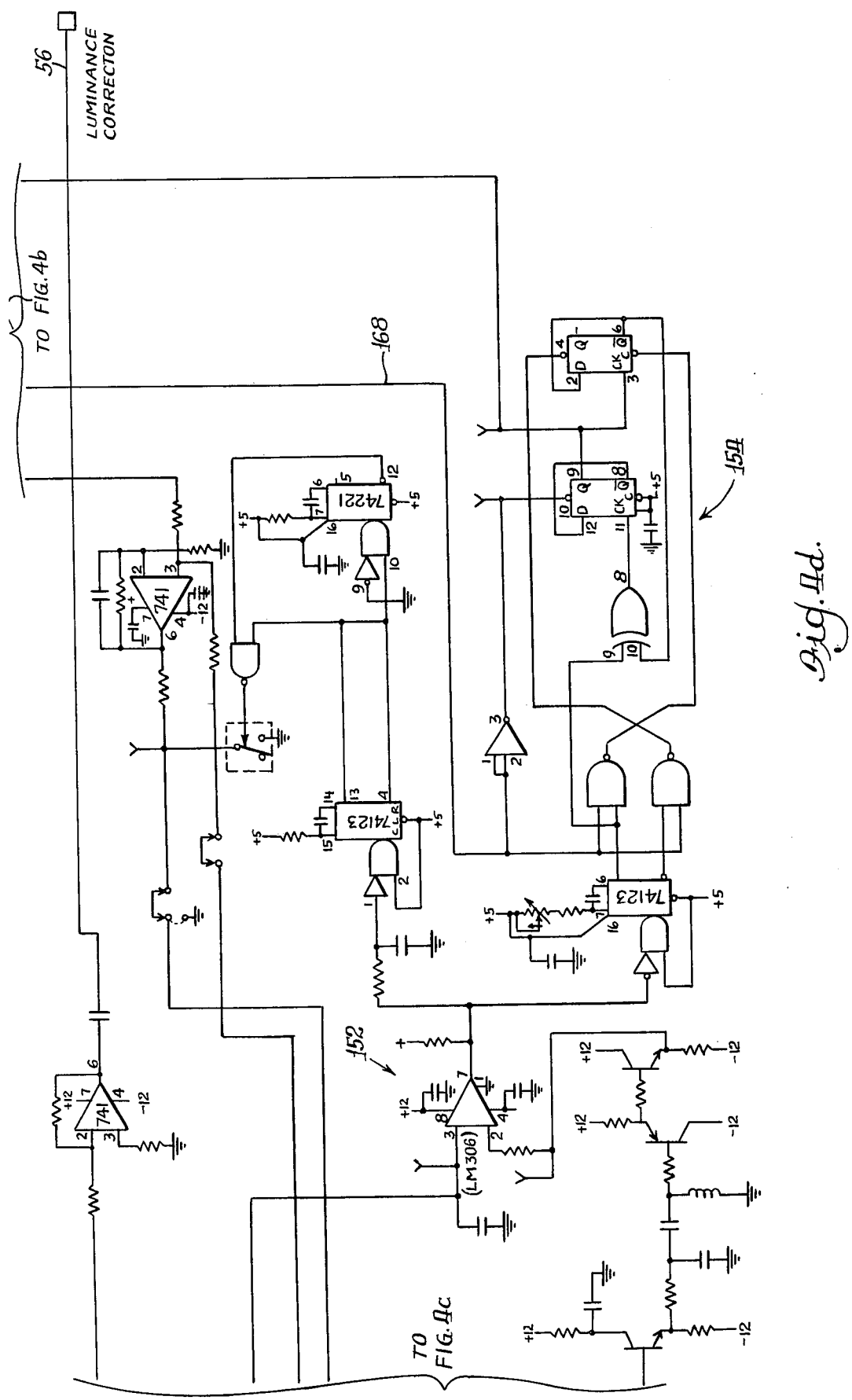

PILOT SIGNAL LUMINANCE CORRECTION MEANS FOR VIDEO RECORDING APPARATUS

The present invention generally relates to video recording apparatus and, more specifically, to a system for providing luminance correction in a color video signal that is derived from a recording medium in a frequency modulated recording and reproducing system that utilizes a pilot frequency signal.

The continued research and development in the field of video recording, particularly videotape recording and playback apparatus, continues to increase the quality and reliability of the recording and playback process. The recording and playback process requires precisely controlled relative movement of the recording medium and the transducing heads which record on and playback from the recording medium. Since the accuracy required for recording color video signals is extremely high, various compensating or correcting processes and schemes have been devised to remove errors (time base and amplitude errors) caused by variations in the relative movement.

Many current videotape recording and reproducing systems utilize the color burst signals which occur near the beginning of each television line (in both the 525 line NTSC standard used in the United States and the 625 line PAL standard used in many foreign countries) as a reference for making time base error corrections since they occur at a known frequency and phase and represent the highest repetitive signal sample rate that is inherently available in the color video signal. Since the off tape color burst signal occurs every 63.5 microseconds, it provides an adequate reference for comparing with an internally generated signal of the same frequency to repetitively correct the off tape color video signal i.e., the color video signal is continuously corrected, but with information derived every 63.5 microseconds. However, there are high rate errors present (those errors which occur between successive color bursts i.e., velocity errors) which produce disturbances that detrimentally affect the video display. The velocity errors have been approximately corrected by assuming a linear variation in the reproduced signal between color bursts.

To increase the basic sampling rate and thereby the correction capability, a signal other than the color burst of the television signal must be employed.

The use of a continuous pilot signal has long been considered to offer many possible advantages for the reason that it allows continuous monitoring of the off tape color video signal, and error detecting schemes can provide closed loop correction of time base errors, velocity errors, and amplitude errors. Therefore, the velocity and amplitude errors can be more accurately corrected than by assuming linear variation in the signal within each television line. While pilot signals have been previously used, many systems have utilized a pilot frequency that is well below the color burst frequency. While such a low frequency pilot signal would generally be representative of timing errors that occurred during the record and playback process, because it is not particularly close to the color subcarrier frequency of the color video signal, it is not subjected to all of the distortions that the chrominance signal experiences. The choice of the frequency of the pilot signal should be optimized so that it is higher than the maximum frequency of the video signal so as not to unduly limit the pass band and not be sufficiently high so that it interferes with other circuit operation, such as beating with the sampling rate of a digital time base correcting circuit, for example. Also, if the pilot signal frequency is chosen to be too high, there is a loss of correlation between the variations in it and the corresponding ones in the chrominance signal itself. Once the pilot frequency is determined, the carrier frequency must be determined (disregarding for the moment such considerations as amplitude of the pilot, pre-emphasis and the like) so that there is an acceptable signal-to-noise ratio of the pilot relative to the video frequencies and cross modulation between the pilot and the video frequencies is not excessive.

When all of these considerations are taken into account to optimize the system for use with a pilot, it has been found that the deviation of the carrier caused by the luminance portion of the color video signal is significantly reduced and that geometric effects such as velocity errors and the like can have a perceptible effect on the luminance level of the color video signal during playback.

Accordingly, it is an object of the present invention to provide a system for providing luminance correction of the demodulated video signal during playback of a recording medium.

A more specific object of the present invention is to provide a luminance correcting signal that is derived from a pilot signal that was added to the color video signal prior to recording.

Other objects and advantages will become apparent upon reading the following detailed description, while referring to the attached drawings, in which:

FIGS. 3a–3e illustrate waveforms of electrical signals that are producing during operation at various locations of the schematic block diagram shown in FIG. 2;

FIGS. 4a–4d illustrate specific electrical circuitry that may be used to carry out the operation of the block diagram illustrated in FIG. 2.

Figure 1:
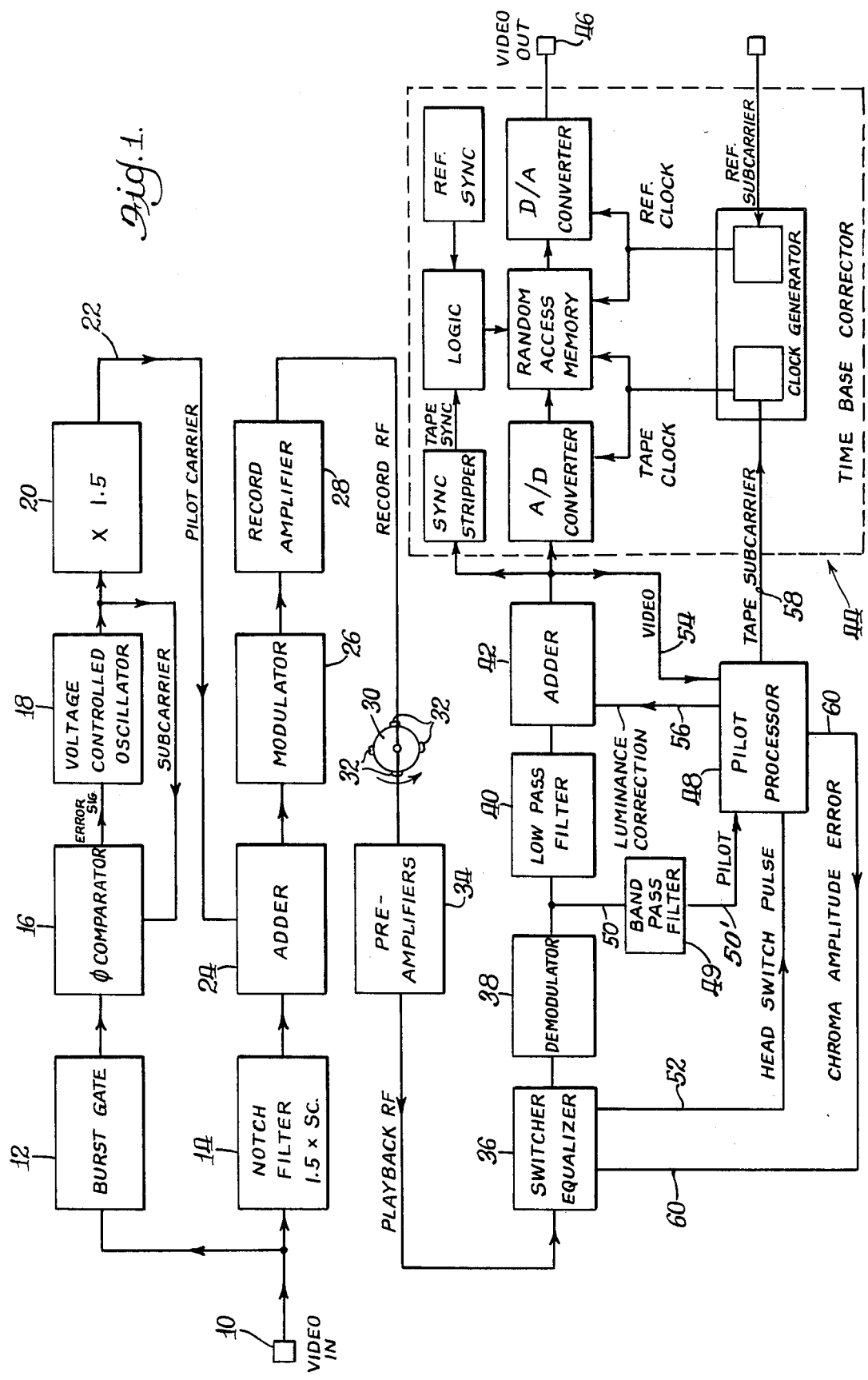
FIG. 1 is a schematic block diagram illustrating a record and playback video recording apparatus and including apparatus embodying the present invention.

Broadly stated, the present invention is directed to a system for providing a luminance correction signal that can be added to the color video signal to provide correction of velocity and other errors that may affect the brightness of the display during playback in a frequency modulated recording and playback apparatus that utilizes a pilot signal that is included in the video signal during the recording process. More specifically, when the pilot signal is added at a higher frequency that the color subcarrier frequency, the carrier frequency that is used to record the video information signal on tape is adjusted to minimize the interference effects that have been previously discussed. When such is done, the frequency deviation of the luminance portion of the color video signal is reduced to either about 0.7 MHz or about 0.85 MHz as opposed to 2.5 MHz and 1.5 MHz for the 525 and 625 line standards, respectively.

The invention is adapted for use with broadcast quality recording and reproducing apparatus and particularly the quadruplex broadcast format which utilizes a head wheel that carries four recording and playback transducing heads mounted at 90° with respect to each other, wherein the head wheel is rotated to either record or playback tracks that are transversely oriented relative to the longitudinal direction of the tape. The tape is generally about 2 inches wide and is held across its width by means of a vacuum in a guide which forms it into an arc of a radius generally corresponding to that of the transducing heads of the guide wheel. During recording or playback, the guide presents the tape to the rotating heads, causing the heads to penetrate a small distance into the tape, i.e., about 0.003 inches, for example, as the heads scan the tape from edge to edge as the tape is pulled longitudinally past the rotating heads and the guide, all of which considerations are well known in the art.

Since the four heads are rotating to follow successive tracks during playback of the tape, the position of the tape relative to the head wheel is important in that geometric misalignment can produce variations in the signal that is being read. For example, if the effective radius of the tape changes with respect to the rotating heads, i.e., the bottom portion of the tape guide is spaced away from the heads by a slight amount, a velocity error can be created for the reason that with a constant angular velocity of the head wheel, a change in the effective radius of the tips of the heads relative to the tape will increase or decrease the head tip velocity. Stated in other words, the end result is that the velocity varies in proportion to the effective radius of the head tip to tape contact from the axis of the head wheel so that the positioning of the guide is extremely important in minimizing velocity errors of such apparatus, particularly in light of the fact that color video signals are preferably stable within about plus or minus 3 nanoseconds.

Such velocity errors can detrimentally affect the luminance information of the demodulated signal that is derived from the tape during playback and the present invention provides a luminance correction signal for addition to the demodulated video signal to correct for normal velocity errors that may occur due to geometric misalignment and the like.

Turning now to the drawings and particularly FIG. 1, there is shown a schematic block diagram of a videotape recording and playback apparatus, somewhat simplified for the sake of clarity, but embodying the present invention. The video signal that is to be recorded is applied at input 10 to a color burst gate 12 as well as a notch filter 14 which passes the video signal except for a small bandwidth at the frequency of 1.5 times the color subcarrier frequency which is either 3.58 MHz for NTSC standard or 4.43 MHz for PAL standard.

The color burst signal from the video signal is applied from burst gate 12 to a phase comparator 16 which provides an error signal to a voltage controlled oscillator 18 which has a feedback path which phase locks the signal so that the output from the voltage controlled oscillator is locked to the color burst signal of the video information signal and it is multiplied by a multiplier 20 to produce a pilot signal having a frequency of 1½ times the color subcarrier frequency of the video signal. The pilot signal is applied on line 22 to adder 24 which adds the pilot signal at an amplitude of about 15% relative to the video signal and the output from the adder is supplied to the modulator 26 and a record amplifier 28 for recording on tape by apparatus which is schematically illustrated to include a rotating head wheel 30 having four transducing heads 32 located thereon.

The subsequent reproducing of the signal from the magnetic videotape is performed by the transducing heads 32 on the rotating head wheel 30 in a similar manner and the playback signal is applied to a switching equalizer 36 which compensates for amplitude and other variations that may occur to the signal as a result of sequential switching of the heads 32 which may have slightly different response characteristics. The output of the switching equalizer 36 is applied to a demodulator 38 and its output is fed to a low pass filter 40 and thereafter to an adder 42 before being applied to a digital time base corrector, which is indicated generally at 44, and includes the components within the dotted lines. The time base corrector periodically samples the timing component associated with the signal and uses the frequency and phase of the pilot signal to control the time base compensation of the video signal. The continuous pilot signal provides a continuous reference signal for use in generating the luminance error compensating signal and the time base corrector also uses the errors that are present in the demodulated pilot signal to generate error correcting signals for correcting the video signal so that a corrected video signal appears at its output 46. The specific operation of the time base corrector will not be described herein for the reason that it does not form a part of the present invention. However, the pilot signal is used as a reference wherein its frequency and phase are used for the time base corrector as previously mentioned. Referring again to the output of the demodulator 38, it is applied to a pilot processor 48 via line 50, a band pass filter 49 in line 50', in addition to being applied to the low pass filter 40. Similarly, switching equalizer 36 is adapted to provide a head switching pulse via line 52 whenever the signal is switched from one transducing head 32 to an adjacent one during rotation of the head wheel. In the NTSC system, the wheel rotates at an angular velocity of 240 revolutions per second which means that the head switch occur four times as often, i.e., at a frequency of 960 Hertz. The pilot processor 48 has an input from the adder 42, via line 54, which applies the video signal to the pilot processor and the color burst from the color video signal is utilized for purposes that will be discussed hereinafter. The output of the pilot processor includes a luminance correction signal that is applied to the adder 42 by line 56 for the purpose of providing the luminance correction of the video signal and an output reflecting the off tape color subcarrier frequency is applied to the time base corrector by line 58. Additionally, the pilot processor provides a chroma amplitude error correcting signal on line 60 which is used by the switcher equalizer 36 to provide chroma amplitude correction as will be discussed.

From the foregoing, it is seen that the pilot signal is applied to the pilot processor 48 from line 50' and a luminance correction signal is applied to the adder 42 via line 56 and the adder adds the luminance correction signal to the video signal to thereby correct the luminance for velocity errors and the like.

Figure 2:
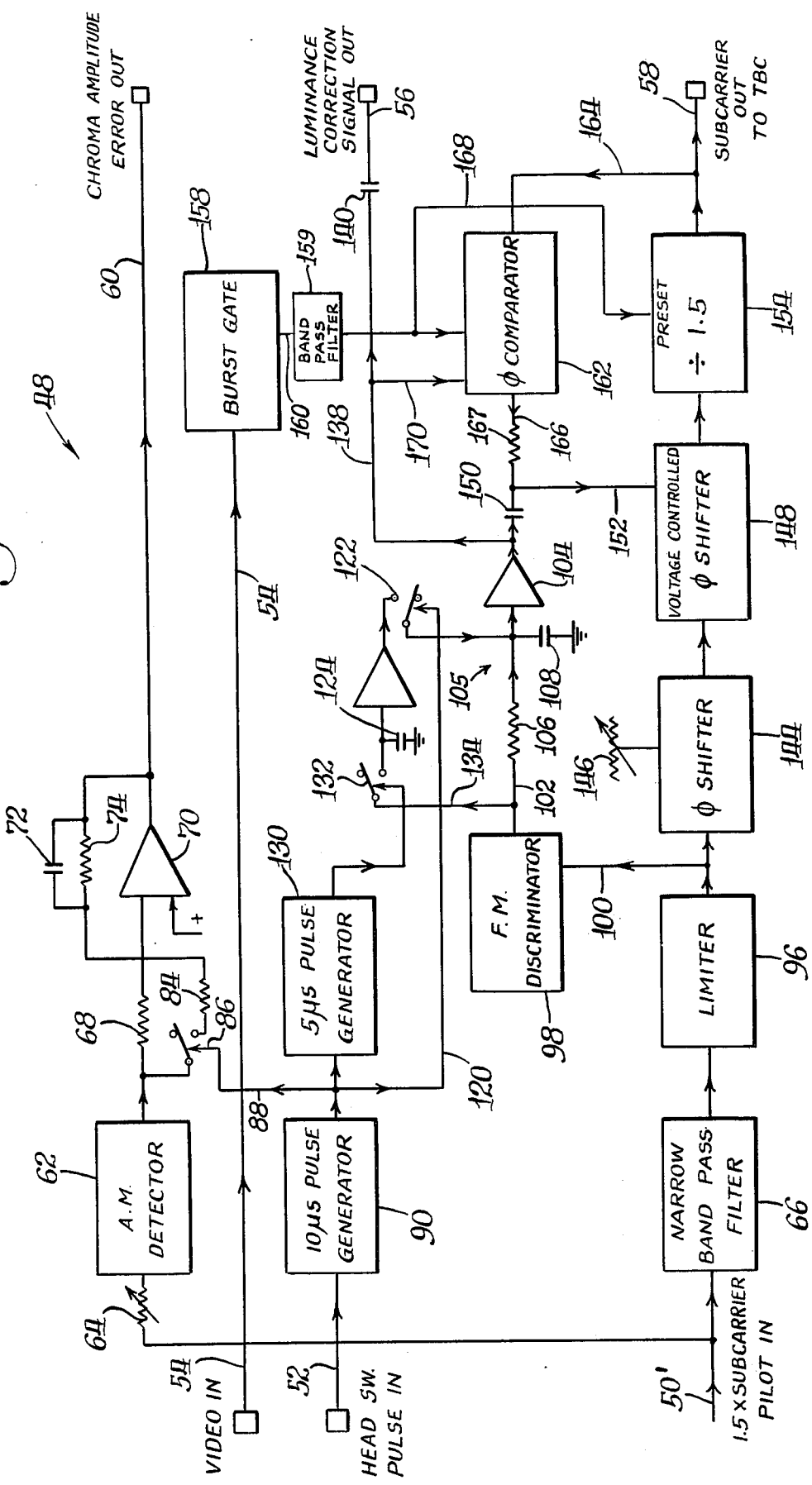
FIG. 2 is a schematic block diagram of a portion of the apparatus shown in FIG. 1 and also embodying the present invention.

To provide the luminance correction, reference is made to FIG. 2 which is a schematic block diagram of the pilot processor 48 shown in FIG. 1. As is shown therein, the pilot signal from the demodulator is applied on line 50' at the lower left hand portion of the drawing. Similarly, the video input from adder appears on line 54 and the head switch pulse on line 52.

With respect to the operation of the pilot processing circuitry 48, the pilot signal appearing on line 50' is applied to an amplitude modulation detector 62 through a potentiometer 64 as well as to a narrow band pass filter 66 in the lower path. The upper path containing the AM detector 62 provides the automatic chroma amplitude error signal that is applied to the equalizer 36 for the purpose of maintaining the relatively constant chroma amplitude in the video signal that is applied to the demodulator 38. Since the amplitude of the pilot signal will represent the amplitude of the chroma, the error signal that appears on line 60 will represent the chroma amplitude error. The output of the AM detector 62 is applied through resistor 68 to an operational amplifier 70 which has a capacitor 72 and a resistor 74 connected in parallel across the amplifier input and output. This arrangement defines a control loop for producing the chroma error that is used to correct the chroma level and it has a frequency response that is compatible with normal variations in the chroma level that occur, except at the occurrence of head switching which produces a rather abrupt change in the chroma level.

In other words, the bandwidth is chosen so that the frequency response will be such that noise is generally disregarded and the changes in amplitude of the chroma level will be followed, except that the frequency response is not fast enough to follow the abrupt changes that occur in the chroma level during head switching. In this regard, the typical chroma errors that may be present are shown in the waveform of FIG. 3d which illustrates a series of generally inclined portions 76 that may have a duration of about 1 millisecond from head switch to head switch, with the head switching occurring at the locations 78. It is seen that the chroma error signals have noise thereon which is represented by the random deviations in the inclined portions 76 and the time constant of the loop is such that the random noise is filtered out. The waveform shown in FIG. 3e is illustrative of the signal that occurs after correction for changes in the chroma level. Thus, the corrected signal is generally constant except for spikes 80 that appear immediately following head switching but these appear during the blanking period of the television signal and therefore do not affect the television picture.

As previously mentioned, the time constant for the loop is such that the bandwidth of the control loop is relatively narrow so as to disregard noise but follow normal variations in the chroma level. However, during head switching time, provision is made for increasing the time constant of the control loop by switching a resistor 84 which is of a value that is preferably much lower, i.e., about 10 times lower, to decrease the time constant of the loop by about 10 times so as to accommodate the abrupt change in the chroma amplitude that occurs during head switching time. Thus, the frequency response of the loop is increased by a factor of 10 so that the change in the chroma level can be followed during the head switching time.

To provide the proper switching action for the control loop, a normally open switch 86 is closed when a triggering signal is applied via line 88. When the switch 86 is closed, the resistors 68 and 84 are connected in parallel which changes the time constant of the loop in the manner as previously mentioned. To provide the signal on line 88, a pulse generator 90 is provided which is triggered by the head switch pulse on line 52 and when it is triggered, it produces a 10 microsecond pulse at its output which closes the switch 86 for that amount of time. At the completion of the 10 microsecond pulse, the switch 86 is switched back to its normally open condition as shown and the time constant is returned to its lower value where the frequency response of the loop is compatible with the normal changes in the chroma amplitude. Referring again to FIG. 3, the 10 microsecond pulse is shown in the upper left corner of the drawing in a representative proportion and the pulses occur at every head switch time 78. The transient signals 80 illustrated in FIG. 3e represent the response of the loop with the higher time constant and the dotted line representations 92 would approximate the frequency response that would occur in the event the switch 86 was not closed and the loop gain not increased in the manner described. In such instance, the chroma level would not be constant and would be varying during the time that the picture is being displayed, rather than only in the blanking period as is desired.

To obtain the luminance correction signal output on line 56, the pilot signal on line 50' from the demodulator via line 50 and band pass filter 49 is passed through the narrow band pass filter 66 which preferably has a pass band of less than about 300 kHz and may be only about 70 kHz and effectively excludes all frequency components outside of that bandwidth. The pilot signal is passed to a limiter 96, the output of which is applied to a FM discriminator 98 which has a voltage output that is proportional to the frequency of the input signal on line 100. The output from the FM discriminator 98 is then applied via line 102 to an amplifier 104 through a filter 105 defined by a resistor 106 and capacitor 108, the time constant of which is chosen to allow for normal changes in the signal that are caused by velocity errors and the like to be adequately followed, but not fast enough to correct for large errors that would occur at head switch time. Since the output signal on line 102 from the FM discriminator is noisy, the filter effectively eliminates the noise but permits correction of normal velocity errors that may occur in the system. In this regard, reference is made to FIGS. 3a and 3b as being illustrative of waveforms that occur at various locations in the circuitry as a result of a typical velocity error that is present in the operation of the apparatus. The error shown in FIG. 3a is generally in the form of a ramp signal wherein the inclined portion 110 represents a typical velocity error that results, for example, from a misalignment of a in a videotape recorder guide and wherein the vertical portion 112 is indicative of switching from one head to another which occurs at a rate of about 960 Hertz since the head wheel is rotated at a 240 Hertz frequency and there are four heads that are located on it. In this regard, it should be understood that the 240 Hertz frequency relates to the NTSC standard and the 960 Hertz head switch frequency would occur when four transducing heads are mounted on the head wheel.

Since the velocity error will be reflected in a deviation of the frequency of the pilot signal from its predetermined value, the output of the FM discriminator will have a waveform as shown in FIG. 3b which comprises a ramp portion 114 (having noise thereon) and a transient signal 116 at head switching time. The filter 105 removes the noise from the output signal of the FM discriminator, but in order to remove the noise, it does not have a frequency response that enables it to follow the rapid transition during head switching time. The output of the filter would generally coincide with the dotted line 118 shown in FIG. 3b which does not represent the velocity error with the desired accuracy. Therefore, provision is made for altering the frequency response to more accurately coincide with the actual velocity error at the input of the amplifier 104 and also remove the undesirable noise that is present in the output of the FM discriminator.

To process the signal that is applied to the amplifier 104 so that it is representative of the velocity error that is actually occurring, such as is shown in FIG. 3a, means are provided to cause the signal to quickly reach the level that the FM discriminator reaches shortly after head switch time and to remove the large switching transients that occur (as shown at 116 in FIG. 3b). The processed signal that is applied to the amplifier 104 is shown in FIG. 3c and is derived by utilizing a sampling technique that is precisely timed relative to head switching to quickly charge the capacitor 108 to the low value that it should have.

To achieve the rapid charging of the capacitor 108, the output of the 10 microsecond pulse generator 90 is also applied via line 120 to a normally open switch 122 which causes it to close and interconnect the capacitor 108 with a capacitor 124 which has been charged to a value that is approximately at the low value shown at the time interval 126 shortly after each head switch. When head switching occurs, the 10 microsecond pulse generator causes the switch 122 to be closed for 10 microseconds and the capacitor 124 quickly charges capacitor 108 to the value stored in the capacitor 124. Thus, closing of switch 122 causes capacitor 108 to quickly acquire the value of capacitor 124. This switching action accomplishes two purposes, i.e., its clamps out the switching transients so that it does not cause any interference and it also changes the error signal quickly to the value that will appear immmediately after the switch returns to its open position. When the switch is opened, the filter is allowed to operate at its normal frequency response which is fast enough to follow any normal velocity errors. It should be appreciated that when a recording apparatus is used that has multiple heads, it can be desirable to have a separate capacitor for each of the heads, and a switch for selectively commutating the appropriate capacitor to apply a holding voltage to the capacitor 108 that is accurate for the characteristics of each head.

The voltage level that is present in capacitor 124 is derived from the discriminator output by a sample and hold technique in the following manner. The end of the 10 microsecond pulse produced by the pulse generator 90 triggers a 5 microsecond pulse generator 130 which controls the operation of a switch 132 which is connected to the output line 102 of the FM discriminator via line 134. The switch 132 thereby interconnects capacitor 124 and the output of the FM discriminator for a 5 microsecond time period immediately following the 10 microsecond time period. The capacitor 124 samples the voltage during the small time interval 128 of each head sweep and thereby stores an average value of the voltage at its lowest value which is the value that is impressed upon the capacitor 108 immediately prior to the sampling time interval. Since the average value is representative of the velocity error that is occurring as determined by the voltage output of the FM discriminator 98, the above described switching action accomplishes the results shown in FIG. 3c wherein a level portion occurs at the beginning of each ramp portion and the large switching transient is effectively clamped out to thereby minimize any interference that may be otherwise generated and it also quickly changes the error signal to the value that it should have. While the signal is generally flat in the approximately 15 microsecond period following head switch rather than having a slope that is representative of the true velocity error, this time period occurs during the horizontal blanking and does not affect the picture.

The processed signal is amplified by amplifier 104 and appears on line 138 which is AC coupled by capacitor 140 to line 56 which provides the luminance correction signal that is added to the color video signal in adder 42.

In addition to providing the luminance correction signal, the pilot signal is also utilized to provide the reference for performing time base correction as previously mentioned. After the pilot passes through the narrow band pass filter 56 and is limited by the limiter 96, it is applied to a static phase shifter 144 which has an associated gain control 146 which can be adjusted to the proper setting to reduce the phase shift to zero. However, the phase shifter 144 works in conjunction with a dynamic phase shifter 148 which effectively adjusts the phase as a function of voltage that is applied to it. The output of the FM discriminator 98 has a voltage that varies in proportion to the frequency of the pilot and the voltage is applied to control the dynamic phase shifter 148 through a capacitor 150 and line 152. The capacitor 150 AC couples the voltage controlled phase shifter since the DC component of the error signal seen subsequently of the band pass filter 66 is not particularly significant. Because of the narrow bandwidth, (preferably less than 300 kHz) of the narrow band pass filter 66, a variation in the frequency of the pilot caused by velocity errors and the like can result in a phase variation or distortion of the pilot signal which is caused by the narrow band pass filter 66 itself. As a result of this effect, the phase of the pilot frequency will not accurately reflect the actual phase of the pilot signal and it is for this reason that the phase shifters 144 and 148 are used to correct for the phase error that is introduced by the narrow band pass filter itself. Since the variation in the frequency of the pilot signal produces an output voltage from frequency discriminator 98 that is proportional to the change to the frequency, the varying voltage controlling the dynamic phase shifter 148 via line 152 defines a control loop that corrects the phase error produced by the band pass filter.

Stated in other words, the voltage of the output of the FM discriminator varies in accordance with the changes in the frequency and since the phase distortion produced by the narrow band pass filter is also known to be a function of the frequency, the voltage output of the FM discriminator controls the dynamic phase shifter 148 in a manner whereby the phase is changed to cancel the phase shift that occurred in the band pass filter. Since the correcting voltage is in proportion to the change, the gain control 146 of the static phase shifter 144 can effectively reduce the phase error produced by the band pass filter 66 to zero. Thus, the pilot signal from the dynamic phase shifter 148 reflects the phase and frequency deviation that occur in the pilot signal which is used to control the time base correcter after going through a divider 154 which divides by 1½ to produce an output signal on line 58 at the subcarrier frequency.

In accordance with another aspect of the system and keeping in mind that the pilot signal phase information is used by the time base correcter, it should be appreciated that the exact phase of the pilot may not correspond to the phase of the color video signal itself. As a practical matter it is unrealistic to assume that all recordings will be made at exactly the same phase relationship, so it is desirable to phase compare the pilot phase with the phase of the video color burst so that they are phase locked. Another factor that could contribute to a phase error of the pilot signal is the temperature sensitivity of circuit components such as the narrow band pass filter and other circuitry that the pilot signal passes through.

To phase compare the pilot and the color burst signal, the video signal is applied through line 54 to a color burst gate 158 which applies the color burst through a band pass filter 159 via line 60 to a phase comparator 162 which compares the phase of the burst with the phase of the pilot from line 164. The output of the phase comparator is a low frequency DC voltage level appearing on line 166 which is also applied to the voltage controlled phase shifter through a resistor 167. Thus, the phase comparing of the color burst with the pilot provides a low frequency or DC error correcting voltage which operates over a long period of time to lock the color burst with the pilot phase. The resistor 167 and the capacitor 150 define a filter through which the signal from the phase comparator 162 is applied to the phase shifter 148. It may be desirable to have a separate capacitor 150 for each head, with a commutating switch for selectively connecting them to the resistor, in the event multiple heads are used, to correct for differences that exist in the pilot to burst phase relationship for each head. The use of the separate capacitors that are commutated enables an average correcting value for each head to be applied rather than an average value for all heads as is the case when only one capacitor 150 is used.

The color burst is also used to perform another function with respect to the pilot signal before it is applied to the time base corrector 44 and the output of the burst gate on line 160 also is applied to a preset input of the divider 154 via line 168. The reason for using the color burst to preset the divider is that using a multiplier to obtain the pilot frequency of 1½ times the subcarrier frequency requires a multiplication by 3 (as well as a divide by 2), and the subsequent division by 3 (and multiplication by 2) introduces an ambiguity in the signal in that it can take any one of three distinct phases. Thus, the burst gate 158 is used to generate one or more color bursts to preset the divider 154 to resolve the ambiguity of the divided subcarrier.

It could also be appreciated that the same phase distortion effects that are produced by the narrow band pass filter 66 also are occurring in other portions of the circuitry, such as in the time base corrector and in the somewhat wider band pass filter 159 which has a pass band of within the range of about 100 kHz to about 300 MHz. The error accumulates throughout the system, partially in the time base corrector and partially in the demodulator 38. To correct for this accumulated phase error, another error correcting loop is provided by line 170 which interconnects line 138 having the luminance correcting signal thereon with the phase comparator 162. Since the phase comparator 162 compares the color burst signal with the color subcarrier frequency, the signal applied to the phase comparator from line 170 merely modulates the reference of the phase comparator to subtract out whatever errors that have accumulated in the system. For example, if the head wheel was running too fast, the burst frequency would be too high, and since the color burst has gone through some band limiting filters, it would be phase shifted, so there would be a burst phase error. This is applied in a phase that would shift it back and subtract the error and the error correction is a DC component that is applied to the voltage controlled phase shifter 148 through line 166 and 152 in the same manner as described.

Specific electrical circuitry that may be used to carry out the operation described with respect to the block diagrams of FIG. 2 are shown in FIGS. 4a–4d, which can be grouped together to form a composite drawing for the circuitry. The numbers shown within the blocks or in parenthesis adjacent thereto represents standard industry numbers for integrated circuits or TTL logic components and the like. Where appropriate, pin numbers of the integrated circuits are also illustrated and the reference numbers from the block diagram of FIG. 2 are applied where appropriate. The operation of the circuitry shown in FIG. 4 is substantially similar to that described with respect to the operation of the apparatus schematically illustrated in FIGS. 1 and 2.

From the foregoing description, it sould be understood that a system is disclosed for providing luminance error correction of video signals that is particularly adapted for use in a system where a pilot signal is used and, because of practical interference considerations, the pass band for the luminance portion of the video signal has been reduced to a level which necessitates such luminance correction. The pilot signal is used to generate the luminance correction signals to compensate for velocity errors and the like that may detrimentally affect the luminance or brightness of the television picture during playback of this playback. The luminance correction signal is made to follow normal velocity errors without introducing unwanted noise into the video signal, but by reason of a unique sample and hold scheme is made to accurately follow the abrupt changes that occur in the luminance level during head switching time which occurs at frequencies of about 960 Hertz. The slight deviation of the signal relative to a typical velocity error signal immediately after head switching does not detrimentally affect the video signal for the reason that it occurs during the blanking period and therefore does not affect the picture that is produced.

It is of course understood that although preferred embodiments of the present invention have been illustrated and described, various modifications, alternatives and equivalents thereof will become apparent to those skilled in the art and, accordingly, the scope of the present invention should be defined only by the appended claims and equivalents thereof.

Various features of the invention are set forth in the following claims.

What is claimed is:

1. In video recording and reproducing apparatus of the type which has at least one transducing head which cooperates to record on and reproduce from a recording medium and utilizes frequency modulation of a carrier signal with a video signal, said video signal having a pilot signal of predetermined frequency included therein prior to recording, a system for providing luminance error correcting signals during reproducing for combining with the video signal, comprising:

means for recovering said pilot signal from the video signal following demodulation;

discriminating means associated with said recovering means for generating a voltage output that varies in proportion to the frequency deviation of said pilot frequency;

means for filtering said output voltage to eliminate noise therefrom, said filtering means having a frequency response that enables said filtering means to accurately follow errors introduced as a result of velocity errors that can be produced by the recording apparatus; and, means for adding the filtered output voltage provided by said filtering means to the demodulated video signal to correct for luminance errors which result from said velocity errors.

2. A system as defined in claim 1 wherein said recovering means comprises a narrow band pass filter.

3. A system as defined in claim 1 wherein said filtering means comprises a first path having a filter with a frequency response that permits the filter means to follow the errors introduced as a result of normal velocity errors, said frequency response being substantially less than the frequency of errors introduced as a result of switching between two transducing heads.

4. A system as defined in claim 3 wherein said filtering means further includes:

means for adjusting the filtering means to increase the frequency response thereof to thereby enable the filtering means to approximately follow the errors introduced by head switching, said adjusting means being connected to an output of said first path filter, and, switching means associated with said adjusting means to activate the same in response to a signal being applied thereto, said signal occurring approximately at the head switching time.

5. A system as defined in claim 4 wherein said adjusting means comprises means for sampling and holding the level of said voltage output of said discriminating means immediately following the head switching time, and means for forcing the output of said first path filter to the stored level before the output thereof would normally reach said level.

6. A system as defined in claim 5 wherein said first path filter comprises a first capacitor and a resistor.

7. A system as defined in claim 6 wherein said sampling and holding means includes a second capacitor, and said switching means includes a first switch interconnecting said second capacitor and said first capacitor to charge the first capacitor to the voltage level on said second capacitor when closed, said first switch responsive to the activating signal to close for a first predetermined time interval immediately after head switching time.

8. A system as defined in claim 7 wherein said switching means includes a second switch located between said second capacitor and the output of said discriminating means for applying the output voltage of said discriminating means to said second capacitor when closed during a second predetermined time interval subsequently of each head switching to thereby provide an average value of the voltage output during said time interval over a series of repetitions.

9. A system as defined in claim 7 wherein said forcing means includes means responsive to head switching for generating a switch activating signal for closing said first switch for said first predetermined time interval, said switch activating signal having a duration corresponding to said first predetermined time interval, said duration being about 10 microseconds.

10. A system as defined in claim 9 including means for closing said second switch for said second time interval, said second switch closing means providing an output adapted to close the same, said output having a duration of about 5 microseconds.

11. A system as defined in claim 10 wherein said second switch closing means is operatively connected to said first switch closing means and is operable in response to the end of said 10 microsecond output.

12. A system as defined in claim 1 wherein the video signal has a subcarrier frequency and said pilot frequency is 1½ times the subcarrier frequency of said video signal.

13. A system as defined in claim 12 wherein said video signal has a subcarrier frequency of about 3.58 MHz.

14. A system as defined in claim 12 wherein said video signal has a subcarrier frequency of about 4.43 MHz.

15. A system as defined in claim 1 wherein said recovering means comprises a band pass filter having pass band within the range of about 50 kHz to about 300 kHz centered around the frequency of said pilot signal.

16. In video recording and reproducing apparatus of the type which has at least one transducing head which cooperates to record on and reproduce from a recording medium and utilizes frequency modulation of a carrier signal with a video signal, said video signal having a pilot signal of predetermined frequency included therein prior to recording, a system for providing luminance error correcting signals during reproducing for combining with the video signal, comprising:

means for recovering said pilot signal from the video signal following demodulation;

discriminating means associated with said recovering means for generating a voltage output that varies in proportion to the frequency deviation of said pilot frequency caused by velocity errors;

means operatively connected to said discriminating means for adding the output thereof to the demodulated video signal to correct for luminance errors which result from said velocity errors.

* * * * *